(12) United States Patent
Eusterwiemann

(10) Patent No.: US 9,604,734 B2
(45) Date of Patent: Mar. 28, 2017

(54) CENTRING ARRANGEMENT FOR A COMPONENT CARRIER

(71) Applicant: Broetje-Automation GmbH, Wiefelstede (DE)

(72) Inventor: Christoph Eusterwiemann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 45 days.

(21) Appl. No.: 14/341,602

(22) Filed: Jul. 25, 2014

(65) Prior Publication Data
US 2015/0026961 A1    Jan. 29, 2015

(30) Foreign Application Priority Data
Jul. 26, 2013   (DE) .................. 10 2013 108 003

(51) Int. Cl.
*B64F 5/00* (2006.01)
*B23Q 1/25* (2006.01)
(Continued)

(52) U.S. Cl.
CPC ............ *B64F 5/0009* (2013.01); *B23Q 1/015* (2013.01); *B23Q 1/25* (2013.01); *B23Q 3/18* (2013.01);
(Continued)

(58) Field of Classification Search
CPC ......... B64F 5/0009; B23Q 1/015; B23Q 1/25; B23Q 3/18; B23Q 3/183; Y10T 29/53978; Y10T 29/53961; Y10T 29/53687; Y10T 29/5177; Y10T 29/53091; Y10T 29/49998; Y10T 29/53983
See application file for complete search history.

(56) References Cited

U.S. PATENT DOCUMENTS

| 4,598,453 A | 7/1986 | Wills et al. |
| 6,736,384 B2 * | 5/2004 | Yokota .................. B23Q 17/002 269/24 |

(Continued)

FOREIGN PATENT DOCUMENTS

| DE | 20215718 | 2/2003 |
| DE | 202008013438 | 4/2010 |

(Continued)

OTHER PUBLICATIONS

"International Search Report," for EP14177443 related to our file No. 218.0084US01, mailed Nov. 24, 2014 (5 pages).

(Continued)

*Primary Examiner* — John C Hong
(74) *Attorney, Agent, or Firm* — Pauly, Devries, Smith & Deffner, LLC

(57) ABSTRACT

The invention relates to a centring arrangement for a component carrier, in particular for a mounting frame for structural aircraft components, having a centring pin, a centring receptacle for the centring pin, and a rotary drive for rotating the centring pin about a longitudinal axis of the centring pin, so that the centring pin can be brought into centring engagement with the centring receptacle as a result of the rotation. The invention further relates to a method for centring and locking a centring receptacle.

20 Claims, 6 Drawing Sheets

(51) Int. Cl.
*B23Q 1/01* (2006.01)
*B23Q 3/18* (2006.01)

(52) U.S. Cl.
CPC ......... *B23Q 3/183* (2013.01); *Y10T 29/49998* (2015.01); *Y10T 29/5177* (2015.01); *Y10T 29/53091* (2015.01); *Y10T 29/53687* (2015.01); *Y10T 29/53961* (2015.01); *Y10T 29/53978* (2015.01); *Y10T 29/53983* (2015.01)

(56) References Cited

U.S. PATENT DOCUMENTS

| | | | |
|---|---|---|---|
| 8,220,134 B2 | 7/2012 | Matheis et al. | |
| 2007/0187880 A1* | 8/2007 | Chiu | B25B 5/062 269/24 |
| 2008/0237097 A1* | 10/2008 | Kolbe | B30B 11/08 209/655 |

FOREIGN PATENT DOCUMENTS

| | | |
|---|---|---|
| DE | 102013108003 | 1/2015 |
| FR | 2966073 | 4/2012 |
| WO | 2010133653 | 11/2010 |

OTHER PUBLICATIONS

Communication Pursuant to Article 94(3) EPC, Communication Pursuant to Article 94(3) EPC for European Patent Application No. 14177443.0 mailed Dec. 12, 2016 (5 pages), no translation available.

\* cited by examiner

CENTRING ARRANGEMENT FOR A COMPONENT CARRIER

CROSS-REFERENCE TO RELATED APPLICATIONS

This application is a national stage application under 35 U.S.C. 371 of German Patent Application Serial No. DE 10 2013 108 003.0, entitled "Zentrieranordnung für einen Bauteilträger," filed Jul. 26, 2013, the disclosure of which is hereby incorporated by reference herein in their entirety.

FIELD OF THE INVENTION

The invention relates to a centring arrangement for a component carrier and also to a method for centring and locking a centring receptacle using a centring pin.

BACKGROUND

Aircraft and other airborne bodies generally have very large structural components such as wings, tails or parts thereof, for example. For the automated production of the airborne vehicle, said structural components are engineered in correspondingly large processing stations and processed by various machine tools. An exemplary operating step provides for the automated fitting of a series of rivet connections, this often having to have been performed manually in the past.

The prior art, and especially U.S. Pat. No. 8,220,134 which is considered to be the closest prior art, discloses a processing station for structural aircraft components in which a rectangular mounting frame, as component carrier, is held at its lateral sides by two positioning towers and moved during processing. The mounting frame and the workpiece, or especially structural aircraft component, which is mounted on it can be moved as a result of independently vertically shifting the fastening points on the positioning towers and also rotating the mounting frame about the axis which is defined by the fastening points, such that processing by a tool, for example a riveting machine, at various points of the structural aircraft component is possible. This tool is in turn fastened to a C-frame which can move in the longitudinal direction of the mounting frame. This ensures that the tool can reach all of the points of the workpiece which are to be processed.

Owing to the size of the structural aircraft components already described, replacing the structural aircraft components after processing is very complicated.

It is not only necessary to remove the structural aircraft component, which has been completely processed at this processing station, from the mounting frame, but also to position and mount the next structural aircraft component which is still to be processed on the mounting frame—either directly or by means of a special suspension gear which provides the corresponding fastening points. This is not only time-consuming owing to the size of the structural aircraft components, but rather the very narrow tolerances which are required in the field of air and space travel also require extremely accurate positioning of the structural aircraft component on the mounting frame, so that, in the event of automated movement of the mounting frame and of the tool in relation to one another, the necessary operating points on the structural aircraft component can also be correctly controlled by the tool. The manual orientation of the structural aircraft component on the mounting frame known from the prior art also takes a correspondingly long time. The long downtime of the generally very expensive processing station which is required as a result of this accordingly reduces the level of utilization to a significant extent and therefore leads to considerably higher investment costs for each airborne body which is produced. Furthermore, the respective means for orienting the structural aircraft component on the mounting frame also has to ensure that the structural aircraft component does not slip or especially become detached from the mounting frame, in spite of the various movements of the mounting frame about several axes.

The problem of the invention is therefore that of further developing the processing station, which is known from the prior art, for structural aircraft components together with their constituent parts such that the downtime of the processing station when the structural aircraft components which are to be processed on the mounting frame are replaced can be shortened.

SUMMARY

It is important to know that one or more centring pins can be provided on the component carrier, it being possible for said centring pins to be brought into centring engagement with a corresponding respective centring receptacle on the relevant workpiece, that is to say the structural aircraft component or a suspension gear for example, as a result of rotation by means of a rotary drive. The workpiece can therefore be lifted onto the component carrier—for example by a crane or another apparatus, wherein the positioning only has to be precise enough for the centring pin to be guided into the centring receptacle—initially still in a floating manner. Centring, in the case of which the accuracy in respect of positioning which is required for processing is established by means of centring engagement, is only then performed in a further step. In this way, the component carrier can be quickly loaded with the aid of an apparatus such as a crane which can apply the necessary force for moving the structural aircraft component without having to be able to execute particularly precise movements. Centring is then performed in an automatic manner in a second step. As a result, vertical loading of the component carrier, for example with a structural aircraft component, is therefore also possible.

In this case, said centring receptacles do not have to be a constituent part of the workpiece in the proper sense, but rather can be fastened to corresponding points of the workpiece as separate components or can be a constituent part of a corresponding suspension gear. However, this indirect or direct fastening of the centring receptacles on the workpiece can be performed in advance, parallel in relation to and independently of the processing station, so that any time which is taken up for this process does not adversely affect the utilization of the processing station.

The said rotary drive for rotating the centring pin does not necessarily comprise a motor. Instead, said rotary drive can be any, potentially even manually operated, arrangement which can be used to rotate the centring pin as described, the said rotation being performed about a longitudinal axis of the centring pin.

The proposed centring engagement in turn prevents a translatory movement between the centring pin and the centring receptacle along at least one direction which is generally perpendicular to the said longitudinal axis of the centring pin. Therefore, a translatory movement between the component carrier and the workpiece is indirectly prevented in this direction too.

Therefore, as a result of the rotation, a relative position in which a movement in all directions perpendicular to the longitudinal axis is possible between the centring pin and the centring receptacle is converted into a position in which movement is no longer possible between the centring pin and the centring receptacle in at least one such direction which is perpendicular to the longitudinal axis, irrespective of movements which are caused by manufacturing tolerances and are therefore negligible in this case.

Some embodiments describe a refinement of the centring pin and of the centring receptacle, and also corresponding engagement between the said centring pin and centring receptacle, which engagement is particularly suitable for achieving a centring effect. In particular, the centring pin is effectively prevented from catching in the centring receptacle during rotation.

Some embodiments include a variant in which the interlocking connection is established in a radial direction of the centring pin, and in particular only in this radial direction. The workpiece can have different tolerances in different directions, and primarily, as a result of very much larger dimensioning in a specific longitudinal direction of the workpiece, have a pronounced expansion behaviour in this longitudinal direction. For this reason, it may be expedient to permit centring only in another longitudinal direction, which is different to this longitudinal direction, using the centring arrangement. Furthermore, a plurality of proposed centring arrangements are generally provided on a single component carrier. In order to prevent tilting during centring of all of these centring arrangements, and in order to keep the tolerance addition within limits or to avoid the tolerance addition, one-sided centring of this kind, which alternates from centring arrangement to centring arrangement, of a large number of centring arrangements may likewise be advantageous.

In contrast, some embodiments provide centring in more than one direction even using a single proposed centring arrangement, as a result of which even more accurate positioning in a plane is achieved.

In an embodiment, the centring function of the centring arrangement is supplemented with a clamping function. This refinement surprisingly allows the combination of these two requirements which are inherently difficult to reconcile. In order to also prevent movement of the workpiece about a vertical direction of the centring pin after centring, a locking apparatus is additionally provided on the said centring pin. This locking means is particularly expedient when, as in the present case, the component carrier can also rotate such that the workpiece may have to be located even beneath the component carrier and the locking means consequently has to be able to absorb the weight force which acts on the workpiece.

Building on the above, some embodiments include particularly suitable refinements of a clamping apparatus of this kind which makes use, in particular, of the same structures of the centring receptacle as have already been provided for the centring function.

According to an embodiment, a guide is additionally provided, said guide facilitating a certain degree of preliminary orientation of the centring receptacle in relation to the centring pin.

Some embodiments make provision for the centring receptacle to be clamped relative to the clamping area by means of a pretensioning spring which exerts a pretension on the centring pin in the clamping apparatus. A linear drive can then move the centring pin initially away from the clamping area against the pretension of the pretensioning spring and, after the rotation, push the said centring pin against the clamping area again by virtue of the pretensioning spring for centring purposes.

An embodiment relates to a variant in which the rotary drive for rotation, which effects centring, is provided offset in relation to the longitudinal axis of the centring pin in a radial direction. Owing to an arrangement of this kind, the installation space within a rectangular frame housing of the clamping frame can be better utilized when the centring arrangement is provided on a clamping frame of this kind since the centring pins are generally arranged perpendicular to the lateral directions of a frame housing of this kind.

In an embodiment, the invention provides a centring arrangement for a component carrier, such as for a mounting frame for structural aircraft components, having a centring pin, a centring receptacle for the centring pin, and a rotary drive for rotating the centring pin about a longitudinal axis of the centring pin, so that the centring pin can be brought into centring engagement with the centring receptacle as a result of the rotation.

In an embodiment, the centring pin has a closing contour and the centring receptacle has a mating contour for establishing the centring engagement, wherein the closing contour defines a maximum outer closing radius and the mating contour defines a minimum inner contact radius about the longitudinal axis, wherein the closing radius does not exceed the contact radius.

In an embodiment, the closing contour forms a polygon, such as a square, such as wherein the polygon has rounded corners.

In an embodiment, the mating contour has inwardly projecting contact projections, wherein the number of edges of the polygon corresponds to at least, and in some embodiments precisely, the number of contact projections.

In an embodiment, the centring engagement between the centring pin and the centring receptacle is established in a centring direction, which centring direction runs radially in relation to the longitudinal axis and intersects the longitudinal axis.

In an embodiment, in the event of centring engagement, there is a free space between the centring pin and the centring receptacle in a direction of play, such as perpendicular to the centring direction, wherein the direction of play runs radially in relation to the longitudinal axis and intersects the longitudinal axis.

In an embodiment, the centring engagement between the centring pin and the centring receptacle is established in a further centring direction, which further centring direction runs radially in relation to the longitudinal axis and perpendicularly in relation to the centring direction and intersects the longitudinal axis.

In an embodiment, the centring arrangement has a clamping area which is arranged perpendicular to the longitudinal axis, and the centring arrangement has a locking apparatus for locking the centring receptacle with respect to a, such as perpendicular, movement relative to the clamping area.

In an embodiment, the locking apparatus comprises an engagement contour on the centring pin for engaging behind the centring receptacle, such as the engagement contour is arranged offset in relation to the closing contour in the direction of the longitudinal axis, such as wherein the engagement contour is designed to engage behind the mating contour, such as the contact projections, wherein the engagement contour is designed to engage behind the contact projections when the centring pin is brought into centring engagement with the centring receptacle as a result of the rotation.

In an embodiment, the engagement contour has gripping projections which extend from the longitudinal axis in the radial direction and are designed to engage behind the contact projections when the centring pin is brought into centring engagement with the centring receptacle as a result of the rotation, wherein the mating contour has a cutout between the contact projections, wherein the cutouts correspond to the gripping projections to such an extent that the engagement contour can be moved, as a result of the rotation of the centring pin about the longitudinal axis, to a position in relation to the mating contour in which the gripping projections can be aligned with the cutouts and the engagement contour can be shifted by the mating contour.

In an embodiment, the centring arrangement has a pretensioning spring which is designed to exert a force, such as a pretension, onto the centring pin in a direction which points towards the clamping area.

In an embodiment, the centring arrangement has a linear drive for moving the centring pin along the longitudinal axis, wherein the linear drive is arranged at an end of the centring pin which is situated opposite the engagement contour, wherein the linear drive is designed to move the centring pin in a direction which points away from the clamping area.

In an embodiment, the rotary drive has a deflection arm on the centring pin, which deflection arm is arranged radially in relation to the longitudinal axis, wherein the deflection arm is connected to a lifting rod by means of a rotary joint at a radially outer end.

In an embodiment, the centring arrangement comprises a guide which is designed to orient the centring receptacle to the longitudinal axis of the centring pin.

In an embodiment the invention provides a method for centring and locking a centring receptacle on a clamping area, such as on the clamping area of a component carrier, using a centring pin, comprising: moving the centring pin through the centring receptacle, such as against a pretension of a pretensioning spring, so that gripping projections of an engagement contour of the centring pin are guided through cutouts in a mating contour of the centring receptacle, rotating the centring pin about a longitudinal axis of the centring pin, as a result of which a closing contour of the centring pin is brought into centring engagement with the mating contour of the centring receptacle, and at the same time the gripping projections engage behind the mating contour, and pushing the centring receptacle against the clamping area as a result of a movement of the centring pin, such as also effected by the pretension of the pretensioning spring.

BRIEF DESCRIPTION OF THE FIGURES

In the drawing, which illustrates only exemplary embodiments.

DETAILED DESCRIPTION

Figure 1:
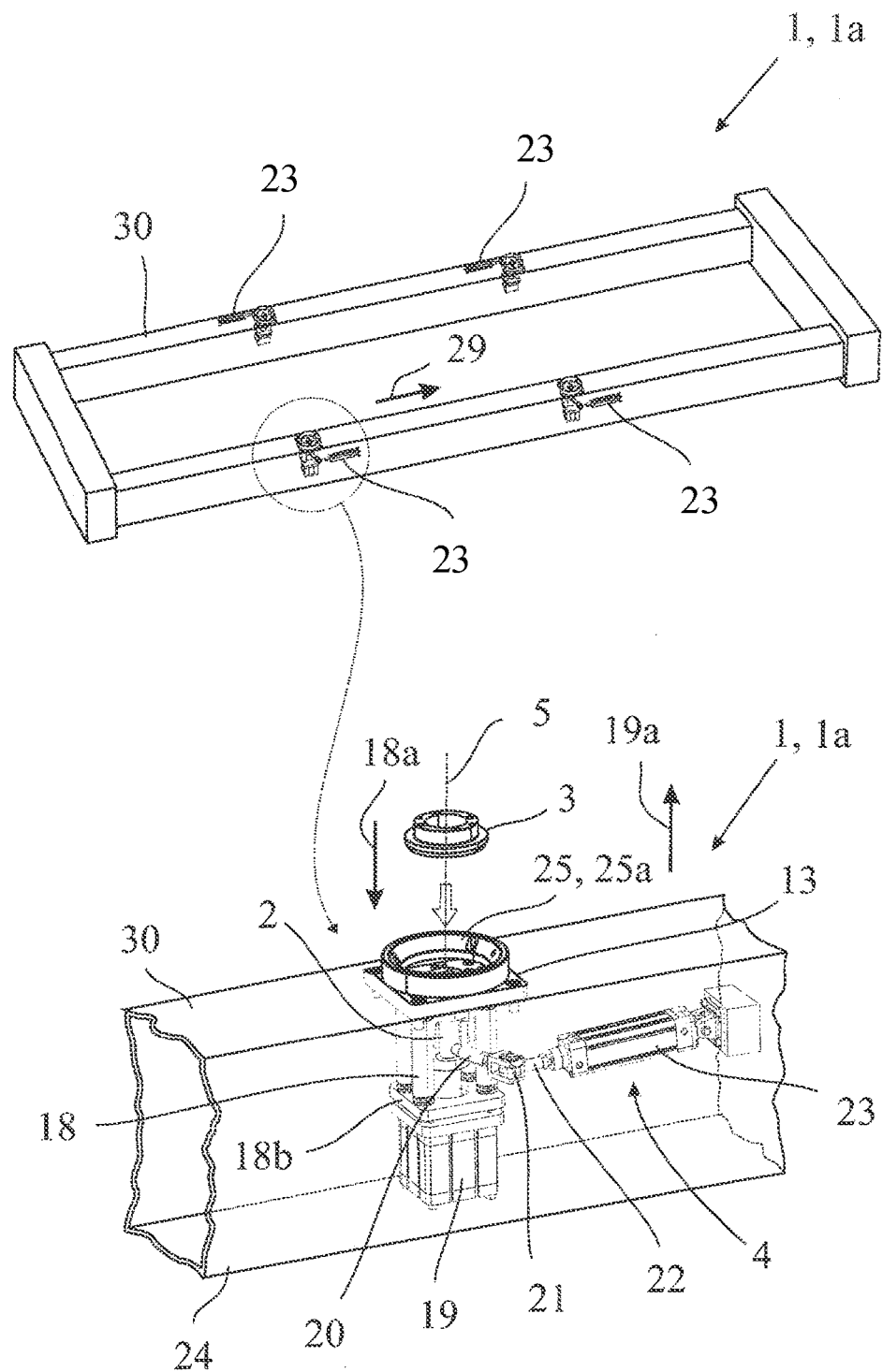
FIG. 1 shows an oblique view of a mounting frame for structural aircraft components having four proposed centring arrangements, one of which is illustrated on an enlarged scale.

A component carrier 1, in particular a mounting frame 1a for structural aircraft components, having four proposed centring arrangements is illustrated in FIG. 1. FIG. 1 additionally illustrates an enlarged oblique view of one of these proposed centring arrangements in the component carrier 1.

The mounting frame 1a shown is, in particular, inserted into a processing station—not illustrated here—for structural aircraft components. The structural aircraft components which can be received by said mounting frame 1a include, in particular, tails and wings of an aircraft and also the constituent parts of said tails and wings.

Figure 2:
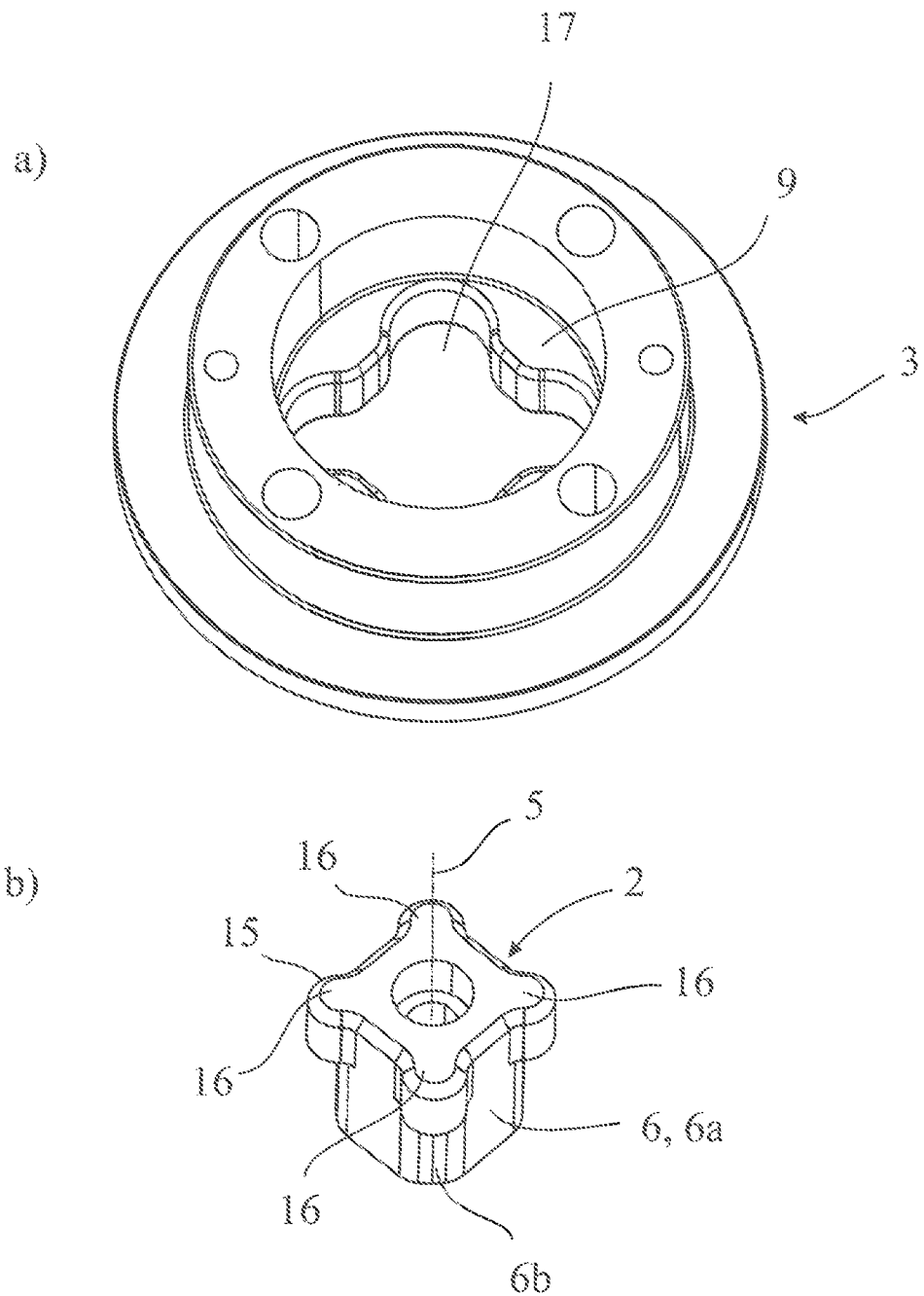
FIGS. 2a, b show an oblique view of the centring receptacle and of the centring pin of the proposed centring arrangement from FIG. 1.
Figure 3:
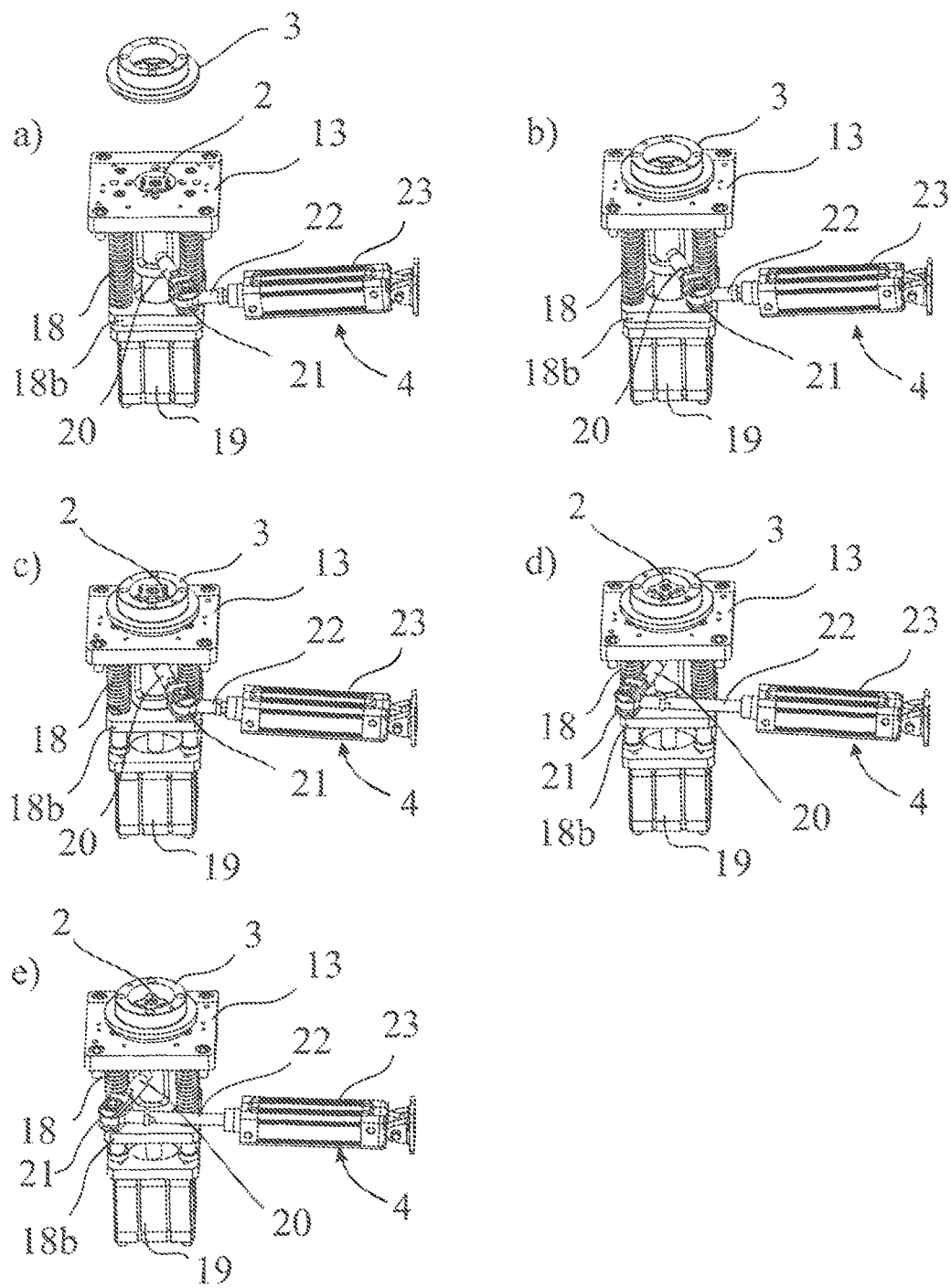
FIGS. 3a-e show an oblique view of the proposed centring arrangement of FIG. 1 in the various stages of a centring process.

The proposed centring arrangement comprises a centring pin 2 and a centring receptacle 3 for the centring pin 2, the said centring pin and centring receptacle being illustrated on an enlarged scale in FIGS. 2b and 2a respectively.

The centring receptacle 3 is therefore designed to receive the centring pin 2 in its opening. In this case, the centring receptacle 3 is arranged on the workpiece and therefore is associated with the workpiece and in particular with the structural aircraft component. This centring receptacle 3 may be a corresponding receptacle and opening on the workpiece itself, or else, as illustrated in FIG. 1, a separate component with an opening of this kind, which component can be detachably fastened to the workpiece in a suitable manner before the workpiece is processed. In addition, the centring receptacle 3 can also be a constituent part of a suspension gear—not shown here—having a plurality of centring receptacles 3 of this kind, which suspension gear can then be connected as a whole to the workpiece in a suitable manner in advance.

Since advance, indirect or direct fastening of the centring receptacle 3 to the workpiece in this way—the details of which are not arrived at in this case—can be performed independently of the processing station both in respect of time and in respect of physical area, the time required for this purpose does not play a critical role since the utilization of the processing station is not adversely affected by said fastening operation.

The proposed centring arrangement further comprises a rotary drive 4 for rotating the centring pin 2 about a longitudinal axis 5—which is to be understood in a geometrical sense—of the centring pin 2, so that the centring pin 2 can be brought into centring engagement with the centring receptacle 3 as a result of the rotation. In this case, the longitudinal axis 5 corresponds here to the main direction of extent of the centring pin 2, as is clear from FIG. 1 in particular.

In this case, the term "engagement" is initially to be understood very generally as mechanical contact between the centring pin 2 and the centring receptacle 3. This engagement is centring in as much as it leads to mechanical shifting of the centring receptacle 3, for example as a result of pushing, into a predefined and therefore centred position in at least one dimension relative to the centring pin 2, provided that the centring receptacle 3 is not already centred in this sense. This centred position can relate to the longitudinal axis 5 of the centring pin 2, so that, in the centred state, the profile of the axis of the centring receptacle 3, which axis corresponds to the longitudinal axis 5 of the centring pin 2, corresponds to the profile of the longitudinal axis 5 of the centring pin 2 in the said, at least one dimension in any case. In the event of centring in two dimensions, that is to say in terms of the area, the corresponding axis of the centring receptacle 3 would coincide with the longitudinal axis 5 in the centred position. Established centring engagement in this sense is illustrated, for example, in the FIG. 4*d*.

Figure 4:
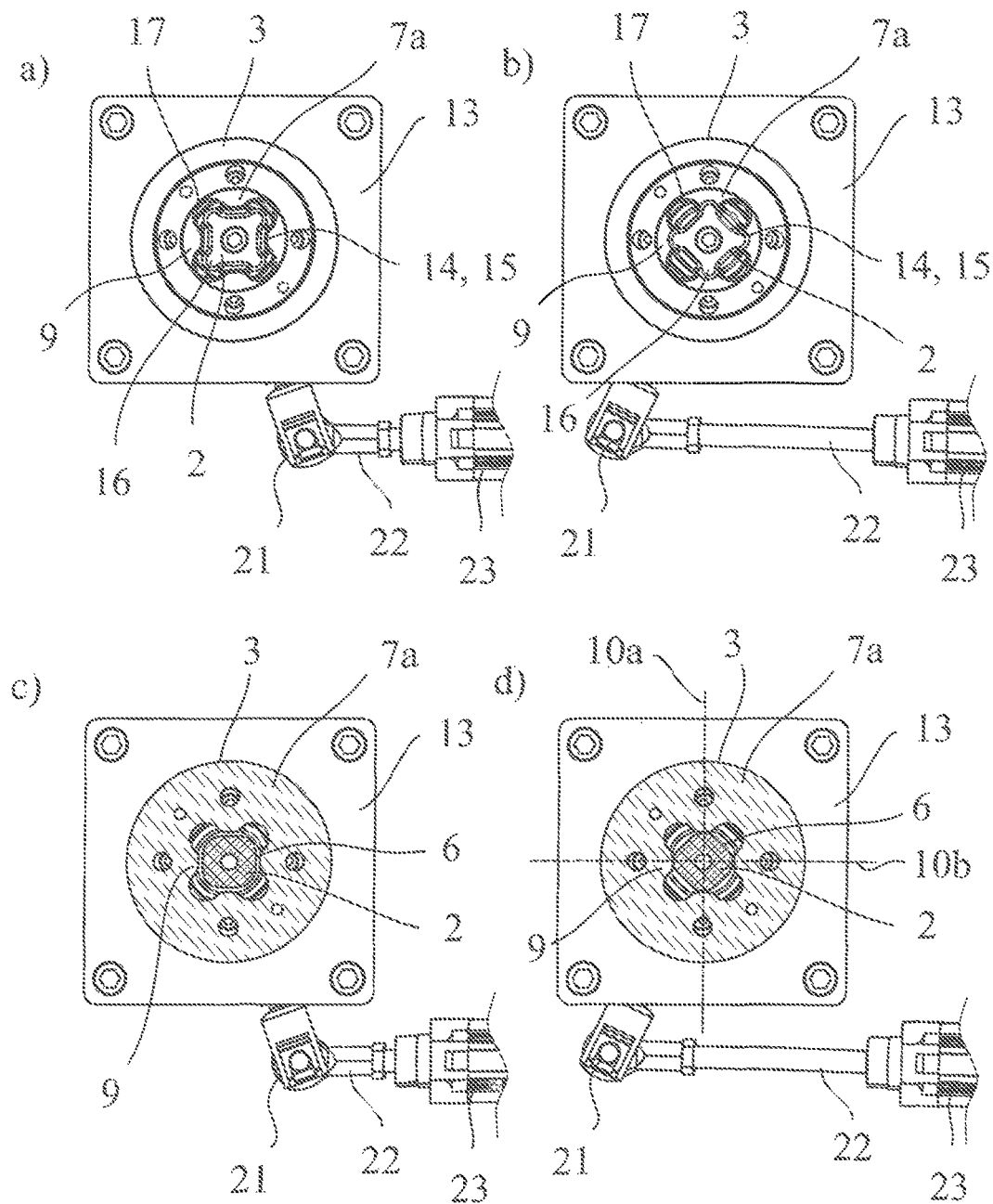
FIGS. 4a-d show a plan view of and a cross section through the proposed centring arrangement of FIG. 1 at two instances during the centring process from FIGS. 3a-e.

The said centring engagement is produced when the centring pin 2 has been received by the centring receptacle 3 in advance. Before the said rotation, the centring pin 2 in any case has sufficient play in the centring receptacle 3 in order to execute rotation until the centring engagement is established. In connection with FIG. 4*d* which has already been mentioned, FIG. 4*c* shows the corresponding state before the centring engagement.

Figure 5:
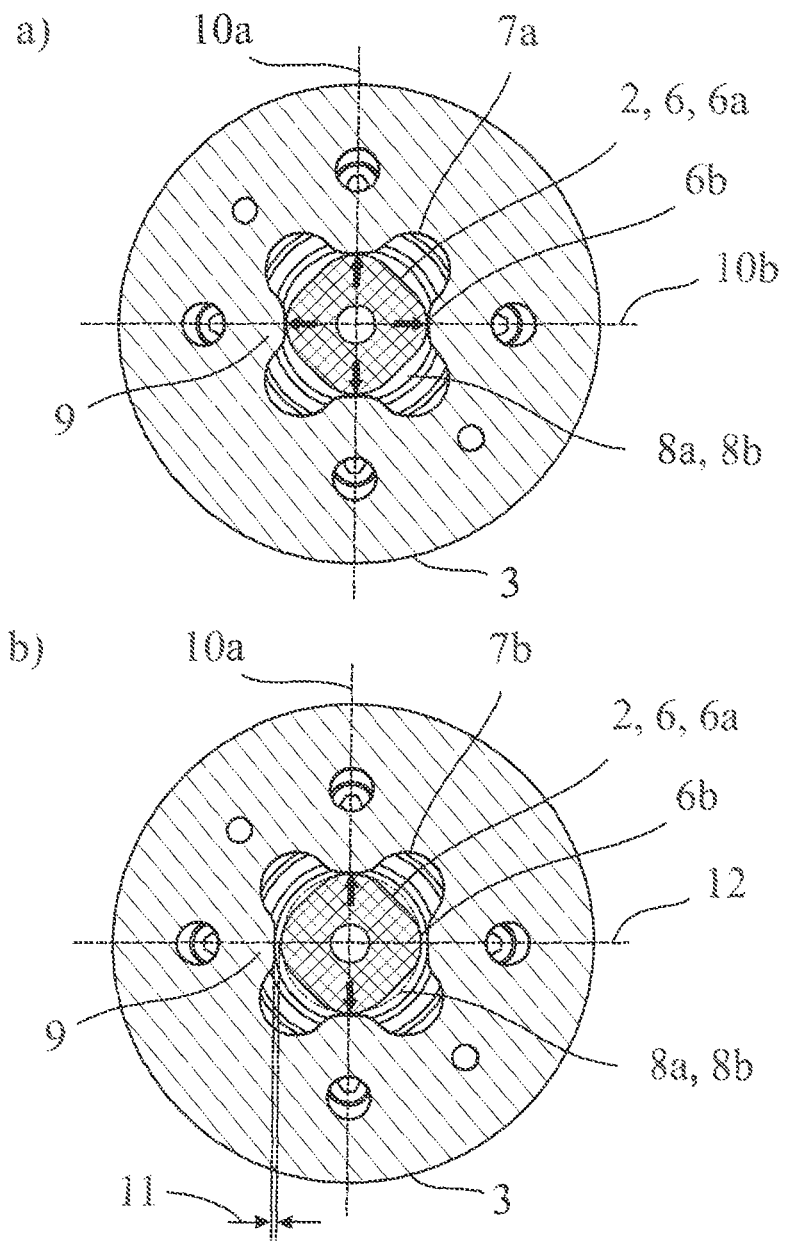
FIGS. 5a, b show a cross-section through the proposed centring arrangement of FIG. 1 and also a cross section through an alternative proposed centring arrangement.

In this case, the centring engagement can perform such that the rotation of the centring pin 2 is not blocked by the centring receptacle 3, but rather the centring pin 2 could still rotate further, wherein centring can then be cancelled again. As shown in FIG. 5*b* in particular, the rotation of the centring pin 2 causes an increase in the size of the effective extent of the centring pin 2 in the direction in which centring is to be performed. When the rotation is complete, as is illustrated in FIG. 5*b*, this extent of the centring pin 2, in its nominal dimension, has reached the extent of the corresponding opening in the centring receptacle 3 as a result of which centring of the centring receptacle 3 is exacted. A further rotation of the centring pin 2 then leads to a reduction in this effective extent in the centring direction.

Accordingly, the centring pin 2 can have a closing contour 6 and for the centring receptacle 3 to have a mating contour 7*a, b* for establishing the centring engagement. A closing contour 6 and two alternative mating contours 7*a, b* are illustrated by way of example in FIGS. 5*a-b*.

In this case, the closing contour 6 represents the cross-sectional outline of the centring pin 2. The mating contour 7*a, b* is accordingly the cross-sectional outline of the centring receptacle 3.

This embodiment further makes provision for the closing contour 6 to define a maximum outer closing radius 8*a* and for the mating contour 7 to define a minimum inner contact radius 8*b* about the longitudinal axis 5, wherein the closing radius 8*a* does not exceed the contact radius 8*b*. As illustrated in FIGS. 5*a, b*, the nominal dimension of the closing radius 8*a* corresponds to the nominal dimension of the contact radius 8*b*, so that deviations are caused only by manufacturing tolerances and moved within these. It should be noted that the contact radius 8*b* is identical for both of the illustrated mating contours 7*a, b*.

The closing radius 8*a* of the closing contour 6 in this sense identifies that radius in relation to the longitudinal axis 5 within which the closing contour 6 is completely enclosed. In other words, the closing contour 6 does not have any constituent part which is radially further away from the longitudinal axis 5 than the closing radius 8*a*. The contact radius 8*b* of the mating contour 7*a, b* analogously identifies that radius in relation to the same longitudinal axis 5 outside which the mating contour 7*a, b* is completely formed. In other words, the mating contour 7*a, b* does not have any constituent part which is radially closer to the longitudinal axis 5 than the contact radius 8*b*.

Since the closing radius 8*a* does not exceed the contact radius 8*b*, it is ensured that in any case no interlocking connection between the closing contour 6 and the mating contour 7*a, b* can prevent the rotation of the centring pin 2 in the centring receptacle 3 for establishing the centring engagement or else can prevent further rotation of the centring pin 2. Actual collision between the centring pin 2 and the centring receptacle 3 during rotation and even catching are prevented as a result. Instead, this promotes the ability of the centring receptacle 3 to move relative to the centring pin 2 in the event of rotation of the centring pin 2, such that the desired centring is achieved.

In an embodiment, the closing contour 6 can form a polygon 6*a*, such as a square. A polygon 6*a* of this kind is suitable for being moved, as a result of rotation about a rotation angle which is defined by the number of edges of the polygon 6*a*, from a position in which there is no centring engagement within the meaning of the proposal, to a position with centring engagement of this kind. This is facilitated, in particular, by the polygon 6*a*, as shown in FIGS. 5*a, b* and FIG. 2*b*, having rounded corners 6*b*.

Building on the above, in some embodiments the mating contour 7*a, b* can have inwardly projecting contact projections 9, wherein the number of edges of the polygon 6*a* corresponds at least, and in some embodiments exactly, to the number of contact projections 9. In this connection, "inwardly projecting" means that the contact projections 9 point radially in the direction of the longitudinal axis 5, and that sections of the mating contour 7*a, b* which are recessed with respect to the said radial direction and which will be discussed in greater detail below are present between the said contact projections 9. Therefore, in a refinement of this kind, it is expedient for the centring engagement between the centring pin 2 and the centring receptacle 3 to be formed by the—radially outwardly pointing—edges of the polygon 6*a* on the one hand and the inwardly projecting contact projections 9 of the mating contour 7*a, b* on the other hand. This substantive matter is shown, in particular, in FIGS. 5*a, b*.

Provision is further made for the centring engagement between the centring pin 2 and the centring receptacle 3 to be established in a centring direction 10*a* which runs radially in relation to the longitudinal axis 5 and intersects the longitudinal axis 5. When the centring pin 2 is rotated, the centring receptacle 3 is therefore necessarily shifted such that the centring action in this centring direction 10*a* begins and, after the centring engagement is established, a further relative movement—apart from negligible shifts owing to manufacturing tolerances—in this centring direction 10*a* is prevented by this centring engagement itself. Establishing that the centring direction 10*a* runs radially in relation to the longitudinal axis 5 and intersects the longitudinal axis 5 could also be formulated such that the centring direction 10*a* is a radial direction of the longitudinal axis 5.

An embodiment, makes provision for there to be a free space 11—which goes beyond the space substantiated in respect of manufacturing—between the centring pin 2 and the centring receptacle 3 in a direction 12 of play in the case of an interlocking connection, wherein the direction 12 of play runs radially in relation to the longitudinal axis 5 and intersects the longitudinal axis 5. In accordance with the above statements in respect of the centring direction 10*a*, this is equivalent to the observation that the direction 12 of play is also a radial direction of the longitudinal axis 5. According to an embodiment, a relative movement between the centring pin 2 and the centring receptacle 3 in the centring direction 10*a* is therefore prevented, but allowed, in principle, in the direction 12 of play. In this case, it may be advantageous for various reasons to define only one centring direction 10*a* for each centring arrangement of the component carrier 1.

One variant according to this first option, in which the direction 12 of play is perpendicular to the centring direction 10*a*, is illustrated in FIG. 5*b*.

A second option of an embodiment, which is illustrated by way of example in FIG. 5a, again makes provision for the interlocking connection between the centring pin 2 and the centring receptacle 3 to be established in a further centring direction 10b, which further centring direction 10b runs radially in relation to the longitudinal axis 5 and perpendicularly in relation to the centring direction 10a and intersects the longitudinal axis 5. Therefore, the further centring direction 10b is also a radial direction of the longitudinal axis 5. Provision is also made in this further centring direction 10b for the nominal dimension of the centring pin 2 to correspond to that of the centring receptacle 3 when the centring engagement between the centring pin 2 and the centring receptacle 3 is established.

Any significant translatory relative movement between the centring pin 2 and the centring receptacle 3 in the area defined by the two centring directions 10a, b is prevented as a result of centring engagement between the centring pin 2 and the centring receptacle 3 in this way in two centring directions 10a, b which are perpendicular in relation to one another. This embodiment option is therefore available, for example, when comprehensive centring on the area which is defined by the mounting frame 1a by an individual proposed centring arrangement is desired.

In order to also prevent a relative movement between the centring pin 2 and the centring receptacle 3 from the area which is defined by the two centring directions 10a, b, but primarily in the direction of the longitudinal axis 5, provision is further made for the centring arrangement to have a clamping area 13 which is arranged perpendicular to the longitudinal axis 5, and for the centring arrangement to have a locking apparatus 14 for locking the centring receptacle 3 with respect to a, such as perpendicular, movement relative to the clamping area 13. This clamping area 13 is to be understood as an area within the meaning of a surface, which area is potentially also formed only in the manner of an edge or web, the locking apparatus 14 preventing a movement of the centring receptacle 3 relative to the said clamping area, for example by a force-fitting connection. Therefore, a movement of this kind of the workpiece is therefore also indirectly prevented. In particular, the centring receptacle 3 can be locked with respect to a, such as perpendicular, movement relative to the clamping area 13 in the direction of the longitudinal axis 5. In this way, locking of the workpiece on the component carrier 1 is also achieved in addition to centring of the workpiece on the component carrier 1.

A corresponding further development for this purpose makes provision for the locking apparatus 14 to comprise an engagement contour 15 on the centring pin 2 for engaging behind the centring receptacle 3. An engagement contour 15 of this kind is clearly shown in FIG. 2b and also in FIGS. 4a-b. The centring receptacle 3 is therefore used not only for the centring engagement with the closing contour 6 but also such that the engagement contour 15 can engage behind it. This in turn allows the centring receptacle 3 to be pushed against the clamping area 13, for example by a force which is exerted on the centring receptacle 3 by means of the engagement contour 15, and therefore to cause the desired locking.

Further advantages result when—as illustrated in FIG. 2b—an engagement contour 15 of this kind is arranged in relation to the closing contour 6 offset in the direction of the longitudinal axis 5, in particular offset only in the direction of the longitudinal axis 5, and therefore centred in relation to the same longitudinal axis 5 as the closing contour 6. The engagement contour 15 can further particularly be arranged so as to directly adjoin the closing contour 6 in the direction of the longitudinal axis 5. Therefore, both the closing contour 6 and also the engagement contour 15 can be introduced into the centring receptacle 3 at the same time as a result of a relative movement of the centring pin 2 in relation to the centring receptacle 3.

The mating contour 7a, b which is already provided for the centring engagement, together with its contact projections 9, which are shown in FIG. 2b for example, of the centring receptacle 3 can also be used in an elegant manner for the blocking operation described here in a double function when the engagement contour 15 is designed to engage behind the mating contour 7a, b and in the process, in particular, to engage behind the contact projections 9. In this case, the same formations of the mating contour 7a, b—that is to say the contact projections 9 in this case—can be used both for the centring engagement—in interaction with the closing contour 6—and also for the locking operation—in interaction with the engagement contour 15. In this case, the centring effect also benefits positioning of the engagement contour 15 relative to the contact projections 9.

The double function can additionally also involve the use of the same rotary movement for the centring engagement and for the process of engaging behind. In this case, provision can be made for the engagement contour 15 to be designed to engage behind the contact projections 9 when the centring pin 2 is brought into centring engagement with the centring receptacle 3 as a result of the rotation. Comparing FIGS. 4a, b on the one hand and FIGS. 4c, d on the other illustrates how the same rotation can effect both the centring engagement and also the process of engaging behind.

A engagement contour 15 of this kind—likewise illustrated in FIG. 2b—has gripping projections 16 which extend from the longitudinal axis 5 in the radial direction and are designed to engage behind the contact projections 9 when the centring pin 2 is brought into centring engagement with the centring receptacle 3 as a result of the rotation. This refinement is well suited to a corresponding refinement, which is illustrated in FIG. 2a, of the mating contour 7a, b which provides cutouts 17 between the contact projections 9.

These components are matched to one another in a particularly suitable manner when the cutouts 17 correspond to the gripping projections 16 to such an extent that the engagement contour 15 can be moved, as a result of the rotation of the centring pin 2 about the longitudinal axis 5, to a position in relation to the mating contour 7 in which the gripping projections 16 can be aligned with the cutouts 17 and the engagement contour 15 can be can be shifted by the mating contour 7a, b. This situation is illustrated in FIG. 4a. In other words, the centring pin 2 can be rotated such that a movement of the centring pin 2 in the direction of the longitudinal axis 5 is possible, it being possible for the engagement contour 15, especially by way of its gripping projections 16, to be shifted past the mating contour 7a, b in the event of this movement. After a movement of this kind, a further rotation—specifically the proposed rotation for the centring engagement—moves the centring pin into a position in which the interlocking connection between the closing contour 6 and the contact projections 9 of the mating contour 7a, b is produced and the gripping projections 16 engage behind the contact projections 9.

As has already been described at the outset, the locking which is likewise established by the centring arrangement has to ensure that the workpiece which is received by the component carrier 1, that is to say a structural aircraft component for example, does not fall down from the component carrier 1. This is also intended to apply in the case of an unexpected power loss in the processing station, for example in the event of a power failure or the operation of an emergency off-switch. Against this background, provision can be made for the centring arrangement to have a pretensioning spring 18 which is designed to exert a force, and in particular pretension, onto the centring pin 2 in a direction 18a which points towards the clamping area 13 and which is identified in FIG. 1.

In the exemplary embodiments shown here, the pretensioning spring 18 is arranged such that it pushes an intermediate carrier 18b, which is connected to the centring pin 2, away from a rear face of the clamping area 13, as a result of which the centring pin 2 is pretensioned in the said direction 18a. Therefore, a force has to be applied in order to move the centring pin 2 out of the locked situation, so that, in the event of a failure of all motors, locking is ensured solely by the pretensioning spring 18 if the centring pin 2 is in corresponding engagement with the centring receptacle 3.

Against this background, provision can be made, for shifting the centring pin 2 as already described above, for the centring arrangement to have a linear drive 19 for moving the centring pin 2 along the longitudinal axis 5. In this case, the linear drive 19 can be arranged, in particular, at an end of the centring pin 2 which is situated opposite the engagement contour 15—and therefore also the closing contour 6. In connection with the activity of the pretensioning spring 18, the linear drive 19 can be designed to move the centring pin 2 in a direction 19b which points away from the clamping area 13. In this case, it is particularly expedient for the linear drive 19 to be fitted on the same intermediate carrier 18b as the said pretensioning spring 18.

Furthermore, the option of a development which utilizes the space in a mounting frame 1a in a particularly economical manner results when the rotary drive 4 has a deflection arm 20 on the centring pin 2, which deflection arm is arranged radially in relation to the longitudinal axis 5. In this way, a motor for effecting rotation in the radial direction can be arranged at a distance from the centring pin 2. This is expedient when there is little installation space in the direction of the longitudinal axis 5 of the centring pin 2. In this development, provision can also be made for the deflection arm 20 to be connected to a lifting rod 22 by means of a rotary joint 21 at a radially outer end. This is shown, in particular, in FIG. 1. The lifting rod 22 in turn can—as is illustrated—be connected to a corresponding linear motor 23.

Figure 6:
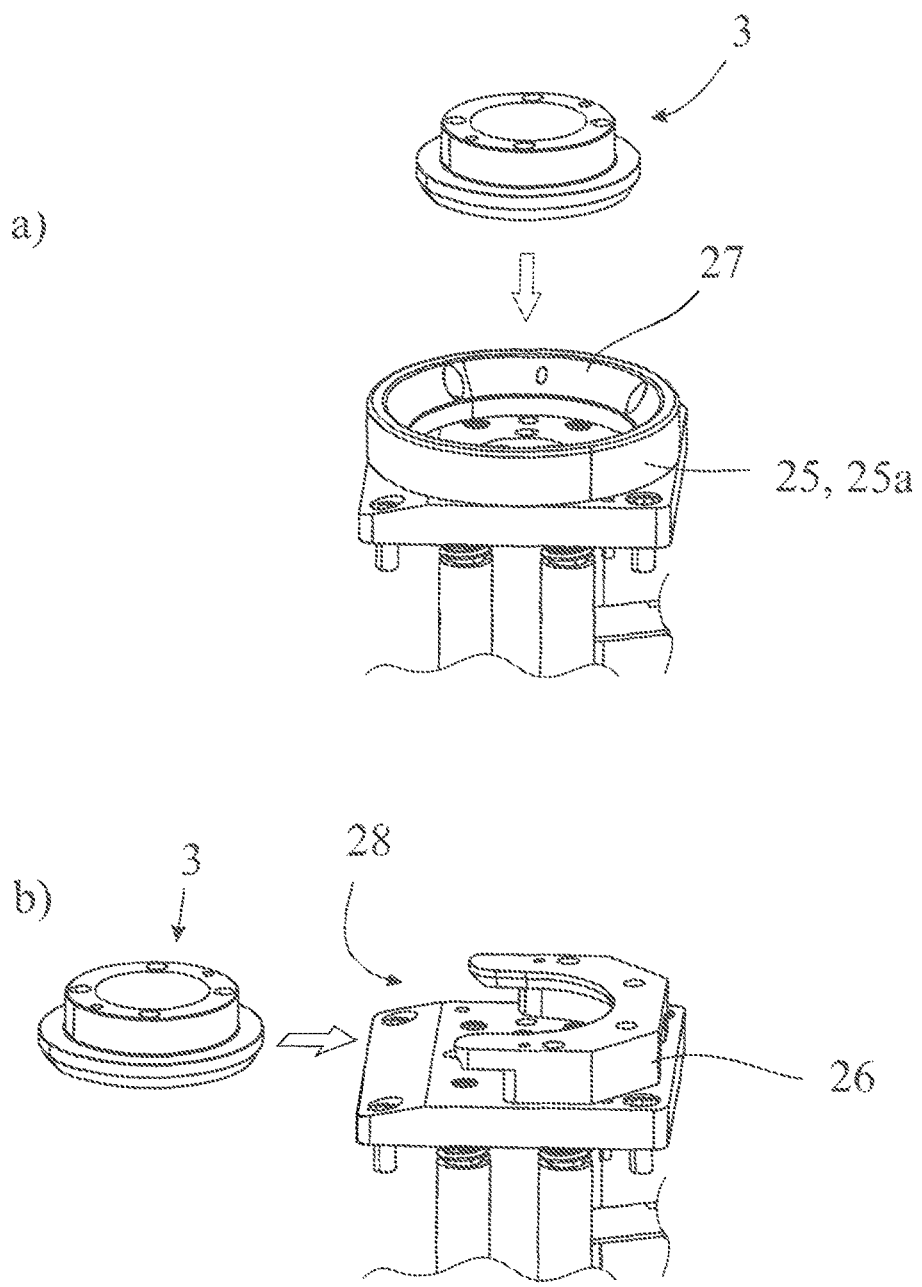
FIGS. 6a, b each show an oblique view of two variants of guides of a proposed centring arrangement.

A further refinement of the proposed centring arrangement, shown in FIGS. 6a, b, comprises a guide 25, 26 which is designed to orient the centring receptacle 3 to the longitudinal axis 5 of the centring pin 2. In this case, the shape of the guide 25, 26 is dependent on the position of the centring arrangement on the clamping frame 1a.

If, as illustrated in FIG. 1, the proposed centring arrangement on the mounting frame 1a has a vertical, upwardly directed orientation, determined on the basis of the longitudinal axis 5 of the centring pin 2, the guide 25 according to the illustration of FIG. 6a can be designed in the form of a ring 25a which has a tapering inner surface 27. A centring receptacle 3 approaching from above then slides on this tapering inner surface in the direction of the centre of the guide 25, as a result of which preliminary alignment of the centring receptacle 3 is effected to that effect, in accordance with which the centring pin 2 is aligned with the opening in the centring receptacle 3.

As an alternative, the proposed centring arrangement can also have a horizontal alignment on the mounting frame 1a, once again determined on the basis of the longitudinal axis 5 of the centring pin 2. In this case, the guide 26 can be designed in accordance with the illustration of FIG. 6b in the form of a U-shaped fold. The open side 28 of the U-shaped fold in this case likewise points upward in the vertical direction, from which direction the centring receptacle 3 is generally guided into the guide 26. Further refinements of guides of this kind are likewise feasible.

A further embodiment which can be mentioned is a mounting frame 1a for structural aircraft components, as illustrated in FIG. 1 for example, having a frame housing 24 of rectangular shape and a plurality of proposed centring arrangements.

In this case, a further development of a mounting frame 1a of this kind makes provision for the respective clamping area 13 of the centring arrangements to form part of an outer surface 30 of the frame housing 24. If, as is illustrated in FIG. 1, the respective clamping surfaces 13 of the centring arrangements then point in the same direction, the centring arrangements can be used for centring a structural aircraft component which is moved on to the mounting frame 1a from the said direction.

A further development of the mounting frame 1a makes further provision for the mounting frame 1a to have a linear motor 23 for operating a deflection arm 20, wherein the linear motor 23 is arranged within the frame housing 24 in a lateral direction 29 of the rectangular shape. In a clamping frame 1a of this kind, centring and locking can be performed in a fully automatic manner. A lateral direction 29 of the rectangular shape is to be understood to mean any direction which corresponds to the extent of one of the four rectangle sides of the rectangular shape of the clamping frame 1a.

Since the constituent parts of the proposed centring arrangement and its refinements have now been described, a corresponding proposed method for centring and locking a centring receptacle 3 using a centring pin 2 on a clamping surface 13, in particular on the clamping area 13 of a component carrier 1, will be explained with reference to FIGS. 3a-e and also FIGS. 4a-d.

FIG. 4a shows the centring arrangement in the inoperative state before the proposed method is executed and even before the centring receptacle 3 approaches the clamping area 13.

The said proposed method now comprises moving the centring pin 2 through the centring receptacle 3, so that gripping projections 16 of an engagement contour 15 of the centring pin 2 are guided through cutouts 17 in a mating contour 7a, b of the centring receptacle 3. This method step takes place as a transition between the state in FIG. 3b and the state in FIG. 3c. In particular, this movement can be performed against a pretension—already described above— of a pretensioning spring 18 according to the exemplary embodiment of FIG. 3 in a manner effected by the linear drive 19.

The proposed method comprises rotating the centring pin 2 about a longitudinal axis 5 of the centring pin 2, as a result of which a closing contour 6 of the centring pin 2 is brought into centring engagement with the mating contour 7a, b of the centring receptacle 3 and, at the same time, the gripping projections 16 engage behind the mating contour 7a, b. This method step takes place between the illustration of FIG. 3c and that of FIG. 3d. The corresponding transition—in relation to the process of engaging behind the mating contour 7a, b—is likewise shown by comparing FIG. 4a with FIG. 4b and—in relation to the centring engagement—by comparing FIG. 4c with FIG. 4d.

Finally, the proposed method comprises pushing the centring receptacle 3 against the clamping area 13 by virtue of a movement of the centring pin 2. This method step corresponds to the transition from the situation of FIG. 3d to that of FIG. 3e. This movement can be effected in particular, and as already described, by the pretension of the pretensioning spring 18. Therefore, the linear drive 19 does not have to act in this direction, but rather only again suppress the force which was previously directed against the pretensioning spring 18.

Further embodiments of the proposed method can be found in the above-described embodiments of the proposed centring arrangement.

The invention claimed is:

1. A centring arrangement for a component carrier, having a centring pin, a centring receptacle for the centring pin, and a rotary drive for rotating the centring pin about a longitudinal axis of the centring pin, so that the centring pin is brought into centring engagement with the centring receptacle as a result of contact between the centring pin and the receptacle during a rotation of the centring pin.

2. The centring arrangement according to claim 1, wherein the centring pin has a closing contour and the centring receptacle has a mating contour for establishing the centring engagement.

3. The centring arrangement according to claim 2, wherein the closing contour forms a polygon.

4. The centring arrangement according to claim 3, wherein the mating contour has inwardly projecting contact projections, wherein the number of edges of the polygon corresponds to at least the number of contact projections.

5. The centring arrangement according to claim 4, wherein the number of edges of the polygon corresponds to precisely the number of contact projections.

6. The centring arrangement according to claim 2, wherein the closing contour defines a maximum outer closing radius and the mating contour defines a minimum inner contact radius about the longitudinal axis, wherein the closing radius does not exceed the contact radius.

7. The centring arrangement according to claim 3, wherein the closing contour forms a square.

8. The centring arrangement according to claim 1, wherein the centring engagement between the centring pin and the centring receptacle is established in a centring direction, which centring direction runs radially in relation to the longitudinal axis and intersects the longitudinal axis.

9. The centring arrangement according to claim 8, wherein, in the event of centring engagement, there is a free space between the centring pin and the centring receptacle in a direction of play, wherein the direction of play runs radially in relation to the longitudinal axis and intersects the longitudinal axis.

10. The centring arrangement according to claim 9, wherein, the direction of play is perpendicular to the centring direction.

11. The centring arrangement according to claim 8, wherein the centring engagement between the centring pin and the centring receptacle is established in a further centring direction, which further centring direction runs radially in relation to the longitudinal axis and perpendicularly in relation to the centring direction and intersects the longitudinal axis.

12. The centring arrangement according to claim 1, wherein the centring arrangement has a clamping area which is arranged perpendicular to the longitudinal axis, and the centring arrangement has a locking apparatus for locking the centring receptacle with respect to a movement relative to the clamping area.

13. The centring arrangement according to claim 12, wherein the locking apparatus comprises an engagement contour on the centring pin for engaging behind the centring receptacle.

14. The centring arrangement according to claim 13, wherein the engagement contour has gripping projections which extend from the longitudinal axis in the radial direction and are designed to engage behind the contact projections when the centring pin is brought into centring engagement with the centring receptacle as a result of the rotation.

15. The centring arrangement according to claim 12, wherein the centring arrangement has a pretensioning spring which is designed to exert a force onto the centring pin in a direction which points towards the clamping area.

16. The centring arrangement according to claim 12, wherein the centring arrangement has a linear drive for moving the centring pin along the longitudinal axis.

17. The centring arrangement according to claim 1, wherein the rotary drive has a deflection arm on the centring pin, which deflection arm is arranged radially in relation to the longitudinal axis.

18. The centring arrangement according to claim 1, wherein the centring arrangement comprises a guide which is designed to orient the centring receptacle to the longitudinal axis of the centring pin.

19. A method for centring and locking a centring receptacle on a clamping area, using a centring pin, comprising:
moving the centring pin through the centring receptacle, so that gripping projections of an engagement contour of the centring pin are guided through cutouts in a mating contour of the centring receptacle,
rotating the centring pin about a longitudinal axis of the centring pin, as a result of which a closing contour of the centring pin is brought into centring engagement with the mating contour of the centring receptacle due to contact between the centring pin and the receptacle during the rotation, and at the same time the gripping projections engage behind the mating contour, and
pushing the centring receptacle against the clamping area as a result of a movement of the centring pin.

20. The centring arrangement according to claim 1, wherein the centring arrangement has a clamping area which is arranged perpendicular to the longitudinal axis, and the centring arrangement has a locking apparatus for locking the centring receptacle with respect to a perpendicular movement relative to the clamping area.

* * * * *